Patented Dec. 1, 1953

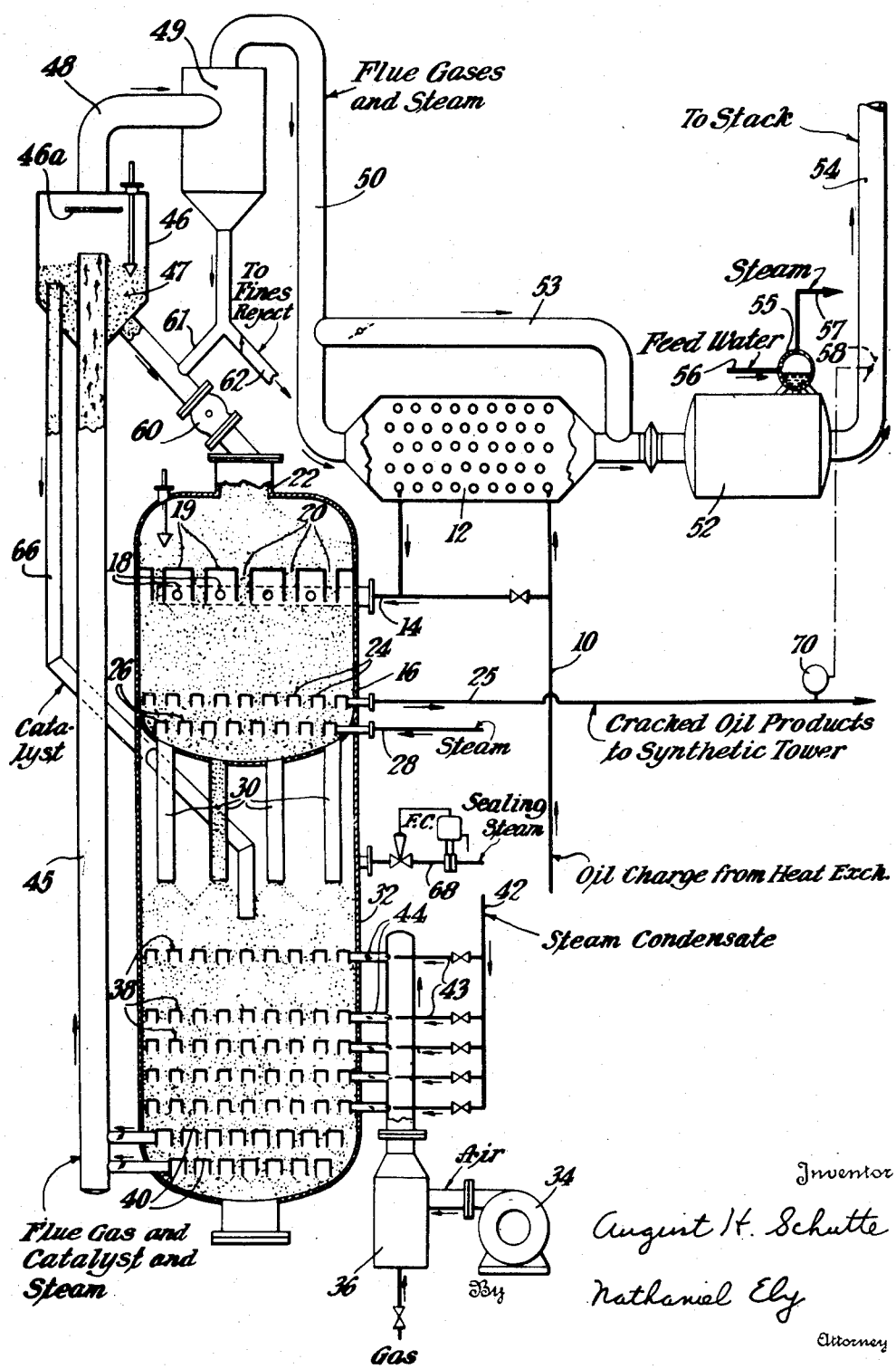

2,661,321

UNITED STATES PATENT OFFICE 2,661,321

HYDROCARBON CONVERSION PROCESS AND REGENERATION OF FOULED CONTACT MATERIAL UTILIZING FLUE GAS AND STEAM AS THE GAS LIFT

August H. Schutte, Hastings on Hudson, N. Y., assignor to The Lummus Company, New York, N. Y., a corporation of Delaware Application November 10, 1952, Serial No. 319,771

6 Claims. (Cl. 196—52)

This invention relates generally to methods of and apparatus for carrying out continuous catalytic reactions such as the cracking of hydrocarbons and it relates more specifically to the regeneration and handling of the contaminated catalyst.

The overall characteristics of the continuously moving granular bed type of cracking units are generally well-known. In general, a suitably preheated hydrocarbon charge usually in vapor form is continuously contacted with preheated granules of the moving bed to bring about a desired reaction in the production of high grade gasoline or other similar desired products. This cracking step results in the deposit of a carbonaceous coating of the granules of the bed which reduces its activity and the granules are then regenerated or revivified by contacting the granules with oxygen containing gases under controlled temperature conditions. Partial combustion and alternate cooling steps for the regeneration of the catalyst have been suggested to limit the burning as the maximum temperature to which the catalyst may be subjected is critical. After regeneration, the catalyst is ordinarily elevated to a position so that it can again flow through the reaction step.

While I describe hereinafter a process of this general type, it will become apparent that I depart from previous and well-known steps whereby I am enabled to obtain substantial economies in construction as well as improvements in operation. By the elimination and substitution of certain apparatus I can materially reduce the cost of the unit which is of particular advantage in small sized units of the order of 5000 bbls./day of fresh charge and it will also appear that even greater economies can be effected in the larger size units which may have a capacity of 10,000 or more barrels per day of charge.

The principal object of my invention is to provide an improved cooling system eliminating considerable apparatus heretofore thought necessary and yet maintaining a simple control which will prevent excessive temperatures in the kiln.

Another object of my invention is to provide an improved flow control from the kiln whereby uniform discharge across the cross section of the kiln is obtained.

A further and major object of my invention is to provide a controlled gas discharge from the kiln the velocity of which exceeds the normal boiling velocity of the packed bed whereby the granules are entrained in the gases and may be elevated to a point above the reactor without the need of other elevating equipment.

More specifically, it is an object of my invention to utilize the energy of the regenerating and cooling gases and vapors from the kiln.

Further objects and advantages of my invention will appear from the following description of a preferred form of embodiment thereof taken in connection with the drawing illustrative of the invention, the drawing being a schematic outline, with parts in section showing a catalyst reaction and regenerating unit.

In accordance with my invention, the hydrocarbon charge in line 10 is suitably preheated by a fired heater or by heat exchange (not shown) or by passing through the convection heater 12, and is introduced through line 14 into the reactor 16. This reactor is preferably a cylindrical shaped vessel and may be provided with distributing conduits 18 which uniformly distribute the feed over the entire cross section of the reactor.

The reactor 16 is provided with a transverse baffle 19 at the upper part to control the flow of the contact material, the baffle having spaced distributing passages 20, which may be tubular or trough shaped through which the granular contact material passes from the inlet 22. The passages 20 serve to form flowing cones or piles depending on the normal angle of repose of the contact material and the feed is distributed to these piles as the contact material moves to the main bed. In this manner, uniformity of distribution is assured. Either liquid or vapor phase or mixed phase charge may be used.

The granular contact material may be any of the well-known catalysts, such as silica gel, metal oxides, etc. whether natural or synthetic and of bead or pellet form and at least one sixteenth of an inch mesh size. A typical size is about 2 x 4 mm. as distinguished from powder.

The contact material moves downwardly by gravity alone as a gravity packed mass or column and in the reactor 16 it passes between the vapor collector elements or channels 24 which are spaced across the lower part of the reactor chamber. The cracked oil product vapors may be removed from such collector channels 24 through line 25 and passed to a suitable treating tower, such as the synthetic tower (not shown).

Immediately below the vapor collection elements 24 is a series of vapor distributing channels 26 which are interconnected with steam line 28. The steam is introduced to prevent the escape of vapors from the reactor 16 by forcing the vapors into the collector elements 24. The steam vapors will pass out through the line 25 above mentioned with the reactants and may be separated from the reactants in a well known manner.

To assure uniform and continuous flow of the contact bed, from the reactor 16 and to serve as a positive pressure seal, I provide a series of tubular members 30 through which the carbonized contact particles pass to the kiln or regenerator, generally indicated at 32. As the coating is carbon, regeneration is accomplished by oxidation. However, I depart from prior practice in regenerating the catalyst. In this case air under pressure of the blower 34 is heated and mixed with flue gas in the heater 36, and is progressively distributed by the channels 38 at different levels in the kiln 32 to all parts of the bed. At the same time, clean water such as steam condensate at 42 is sprayed in a fog in controlled quantities along with the preheated combustion air into the channels 38 through the branch pipes 43.

Due to the high velocities in the inlet air ducts and the relatively slow evaporation rate of the entrained water particles, only a small percentage of the total injected water will be vaporized in the inlet ducts and distributors themselves. The inside surfaces of the distributors will be wetter by and cooled by the water particles which impinge thereon, and the remaining water will be converted into superheated steam by direct contact with the heated catalyst. This also tends to retard combustion as it diminishes the ratio of oxygen available.

The air entering the uppermost set of distributors 38 in the kiln 32 will produce partial combustion of the carbon on the catalyst, and the flue gases so formed will then be joined by the air and water fog introduced at the next lowest set of distributors until the entire amount of contact material is regenerated. If desirable for temperature control, the atomized water may be introduced with a small amount of air or steam in the alternate inlet ducts and air only in the others to obtain alternate burning and cooling zones. The inlet manifolds 44 will be provided with suitable dampers or valves for such purpose. The total quantity of hot flue gases and superheated steam are then removed from the kiln through the two sets of bottom collectors 40.

This practice differs from prior practice in that it has been customary to separately remove the flue gases from each burning zone adjacent the point of generation. It has also been the practice to so design the vapor collectors that the gas disengaging velocities will be sufficiently low to prevent entrainment or boiling of the catalyst particles in the gas outlet ducts.

In accordance with my invention the two outlet collectors are so designed that if one of them were shut off by the outlet damper, the entrainment of catalyst in the other collector would exceed the total required amount of catalyst circulation. With both collectors working to their full capacity, the total catalyst entrainment is considerably more than the required catalyst circulation. The removal of the total kiln gases through these collectors thus affords a means of removing the catalyst uniformly over the whole cross section of the kiln and the dampers in the two outlet ducts permit a rough control of the total rate of catalyst removal.

In view of the fact that the catalyst is supplied at the top of the bed in the kiln 32 by the series of pipes 30, the removal of the catalyst by the vapors as above mentioned will be uniform, because the pipes preclude the formation of valleys in the solids surface and thus eliminate uneven removal and permit a resultant greater vapor flow from the shallower catalyst beds at these points.

It is, of course, to be understood that a conventional vapor draw-off and conventional catalyst flow plate could be used at the bottom of the kiln but they are not found necessary.

I find that the resultant hot gases and superheated steam are of particular advantage in elevating the catalyst to the top of the unit through duct 45. It will be appreciated that the air for regeneration has already been compressed by blower 34 and is under such pressure as to permit general distribution through the kiln 32. It is also to be noted that the combustion increases its volume and greatly increases its temperature. The gases are also substantially in temperature equilibrium with the contact material and with the added presence of the steam which is formed by the vaporization of the cooling water an unusually large volume of the hot vapors are available. These are already intimately mixed with the solids, and it is thus possible to move the contact material without shock and without other energy. There is quantitatively sufficient vapor to elevate the granular particles at relatively low velocities through the duct 45 so as to preclude abnormal breakage.

The liquid water not only accomplishes the desired heat removal but also supplements the enhanced volume of regenerating gas so that the customary elevator may be eliminated. Although advantage is taken of the available flue gases and steam for conveying the catalyst to the overhead hopper, neither the reactor nor the regenerating section of the kiln is fluidized. In both of such portions the contact mass is gravity packed and free flowing solely by gravity.

At the top of the catalyst duct 45, the mixed contact material and vapor stream enters a separator chamber 46 of greatly increased cross section, where the particles lose the sustaining upward gas velocity so that they fall back and are collected in the bin section 47 at the bottom. Impingement plate 46a prevents carry over of solid particles.

The flue gases released from the contact material in hopper 46 are then passed through conduit 48 to cyclone separator 49 for the removal of entrained catalyst fines and the catalyst free flue gases then pass through conduit 50 to heat recovery units. These may include the heater 12, previously mentioned, and the waste heat boiler 52. A bypass 53 may be provided around the heater 12 for purposes of control. The vapors discharge to the stack through line 54. The waste heat boiler 52 may be a steam generating unit having a steam drum 55 to which feed water is fed at 56 and from which steam is removed through line 57.

The pressure on the entire reactor and regenerator is conveniently established by the stack control valve 58 which in turn is operated through control 70 in vapor discharge line 25.

Referring again to the hopper 47, a controlled uniform quantity of hot catalyst is introduced into the reactor 16 through a star feeder 60, or other control in a conventional manner. The fines separated in the cyclone separator 49 may also be recycled in part into the system through leg 61 with a proportion of the fines rejected through line 62.

A portion of the catalyst may also be bypassed across the reactor 16 to kiln 32 by line 66 to return excess material elevated to hopper 47. It is also to be noted that sealing steam under a predetermined flow control may be introduced through line 68 to the portion of the kiln 32 surrounding the down pipes 30 to effect a seal and to prevent the accumulation of any hydrocarbon vapors in this zone.

While in the disclosed embodiment the reactor 16 and the kiln or regenerator 32 are shown as having a common shell for purposes of economy, the sealed chambers thus provided may be made separate, with the tubular members 30 passing the contact particles downwardly through the top of the lower chamber. Steam line 68 would then be in the top space of said lower chamber.

As an example of operating conditions which I find desirable, I introduce the oil charge in line 14 to the reactor 16 at approximately 400° F. to 600° F. onto a bed of catalyst or contact material entering at 22, which is at approximately 1100° F. The bed temperature below the point of feed is approximately 950° F., and the catalyst bed discharges through the tubes 30 at approximately 900° F.

In the kiln, the entering air or oxidizing gas from 34 is raised to approximately 400° F. by the burner 36. Combustion of the carbonaceous deposit is preferably liimted to 1150° F. and by simultaneous oxidation and cooling the material discharging from the collectors 40 is in the range of 1100° to 1150° F.

I find it convenient to operate the system at small pressure differentials, and conveniently the upper part of the reactor 16 is operated at about 6½ lbs./sq. in. with the lower part of the kiln operating at approximately 2½ lbs./sq. in. The disengaging chamber 46 will be operated at approximately one half pound [p. s. i. g.]

Assuming a feed of heavy crude of 3,000 to 5,000 barrels per day, approximately 7,600 cubic feet per minute of air is required for burning off the carbon deposited, and the gases entering the oil convection heater 12 will enter at approximately 1100° F. and will discharge to the stack at temperatures of 500° F. or lower. Such a unit requires the circulation of approximately 100 tons per hour of catalyst which will have approximately 2,500 lbs./hr. of carbon deposit on it.

The invention has been generally described with reference to the catalytic cracking of hydrocarbons which is a most useful purpose. I also am aware of its use on reactions other than cracking in which oxidizable deposits are formed and must be removed. In these cases also, the availability of large quantities of flue gas and steam to aid uniform draw-off, maintain bed temperature and act as an elevating medium is characteristic of my invention.

It is also to be noted as a major characteristic of my invention that no other gas is added to the system other than that required for regeneration and cooling. This avoids the need of any supplemental gas heating and compressing apparatus. Furthermore, the flow of catalyst is controlled entirely by valve 60 at the top of the reactor and is completely independent of the discharge rate. Nevertheless the reactor and regenerator are maintained as full as the natural angle of repose permits.

This application is a continuation-in-part of application Serial No. 22,551, filed April 22, 1948, now abandoned.

While I have shown and described a preferred form of embodiment of my invention, I am aware that modifications may be made thereto which I desire to embrace within the scope and spirit of the description herein and of the claims appended hereinafter.

I claim:

1. A method of continuously converting preheated hydrocarbons by contact with a gravity flowing bed of contact material in particle form in a reaction zone and thereafter revivifying said contact material in a regeneration zone, which comprises distributing said hydrocarbons over a horizontal portion of said gravity flowing bed whereby said hydrocarbons are substantially converted, separating the converted hydrocarbons from said contact material, passing said bed through a vapor sealing zone to said regenerating zone, distributing a combustion supporting gas and water across said regeneration zone at several elevations in intimate contact with said gravity flowing bed whereby said contact material is restored substantially to its original activity and a substantial volume of products of combustion and steam vapor are formed, entraining said particle form contact material in said products of combustion and steam vapor at the bottom portion of said regenerating zone and laterally removing and discharging said contact material in vapor entrainment from said regenerating zone, elevating said entrained contact material by said products of combustion to a position above the reaction zone, and thereafter returning said contact material to said reaction zone.

2. A method for oxidizing carbonaceous deposit on granular contact material, which comprises: passing said deposit bearing contact material in heated condition downwardly as a gravity packed column through a sealed vertical regeneration chamber having a top inlet, a series of vertically spaced vapor distributor channels therein, vapor discharge channel means extending horizontally across the bottom of said chamber below the distributor channels, outlet conduit means extending horizontally from said vapor discharge channel and exteriorly of the said chamber, and an external elevating duct of larger cross section than said outlet conduit means extending vertically therefrom to a point above said chamber; introducing heated oxygen containing gas with atomized liquid water particles under superatmospheric pressure into said vapor distributor channels in amounts sufficient to oxidize the carbonaceous deposit on said heated contact material, to wet and thereby cool the contacted surfaces of said distributor channels and to augment the volume of vapors by water evaporation; passing the entire volume of vapor products through said vapor discharge channel means adjacent the bottom of the chamber at a velocity such as to entrain and remove the granular contact material from the bottom of said gravity packed column by entrainment therein; and increasing the velocity of the vapor products and entrained contact material by passage through said horizontal outlet conduit means, whereby to lift said contact material through said elevating duct.

3. A regenerator for oxidizing the carbonaceous deposit on a granular contact material which consists of a sealed chamber having an inlet at the top for the granular material, a horizontally extending outlet conduit adjacent the lower part of the chamber for discharging the material, a confined path elevating duct extending upwardly from the outer end of said conduit to above the chamber, said chamber having a series of vertically spaced vapor distributor channels therein, means to introduce heated air and liquid water in proportioned amounts into each of said channels, a vapor discharge channel adjacent the bottom of the chamber and below said distributor channels, said discharge conduit communicating with the discharge outlet, the discharge outlet being of such reduced size as to establish entrainment of the granular material in the products of combustion passing out of the chamber, and means to maintain a sufficient flow of gases downwardly through the chamber and upwardly through the conduit to establish uniform particle removal from the chamber and elevation of the particles above the chamber.

4. A continuous catalytic cracking and regenerating unit having a common shell providing an upper sealed chamber and a lower sealed chamber, said upper chamber having an inlet for catalytic material, means to distribute a charge over the material that passes through said upper chamber, said upper chamber having a plurality of depending conduits extending therebelow into the upper part of said lower chamber, a plurality of vapor collecting channels extending across the lower part of said lower chamber, a vertical conduit interconnected with said channels and to a position above said upper chamber, means to introduce a gaseous medium into said lower chamber whereby catalytic material therein will be discharged solely by said gaseous medium from said lower chamber through said vertical conduit and to a position above said upper chamber, and means to conduct the catalytic material from said elevated position to said upper chamber.

5. A continuous catalytic cracking and regenerating unit having an upper sealed chamber and a lower sealed chamber, said upper chamber having an inlet for catalytic material, means to distribute a charge over the material that passes through said upper chamber, said upper chamber having a plurality of depending conduits extending therebelow into the upper part of said lower chamber, a plurality of vapor collecting channels extending across the lower part of said lower chamber, a vertical conduit interconnected with said channels and to a position above said upper chamber, means to introduce a gaseous medium into said lower chamber and downwardly through said chamber whereby catalytic material therein will be regenerated and discharged solely by said gaseous medium from said lower chamber through said vapor collecting channels into said vertical conduit and to a position above said upper chamber, and means to conduct the catalytic material from said elevated position to said upper chamber.

6. A continuous catalytic cracking and regenerating unit as claimed in claim 5 having means to introduce liquid water into said vapor cooling channels to cool said catalytic material and supplement the lifting effect of said gaseous medium.

AUGUST H. SCHUTTE.

References Cited in the file of this patent

UNITED STATES PATENTS

| Number | Name | Date |
|---|---|---|
| 2,448,334 | Watson | Aug. 31, 1948 |